May 10, 1960 C. R. NAILLER ET AL 2,936,257
METHOD AND APPARATUS FOR SPLICING ELECTRICAL MINING CABLE
Filed Dec. 4, 1956 2 Sheets-Sheet 1
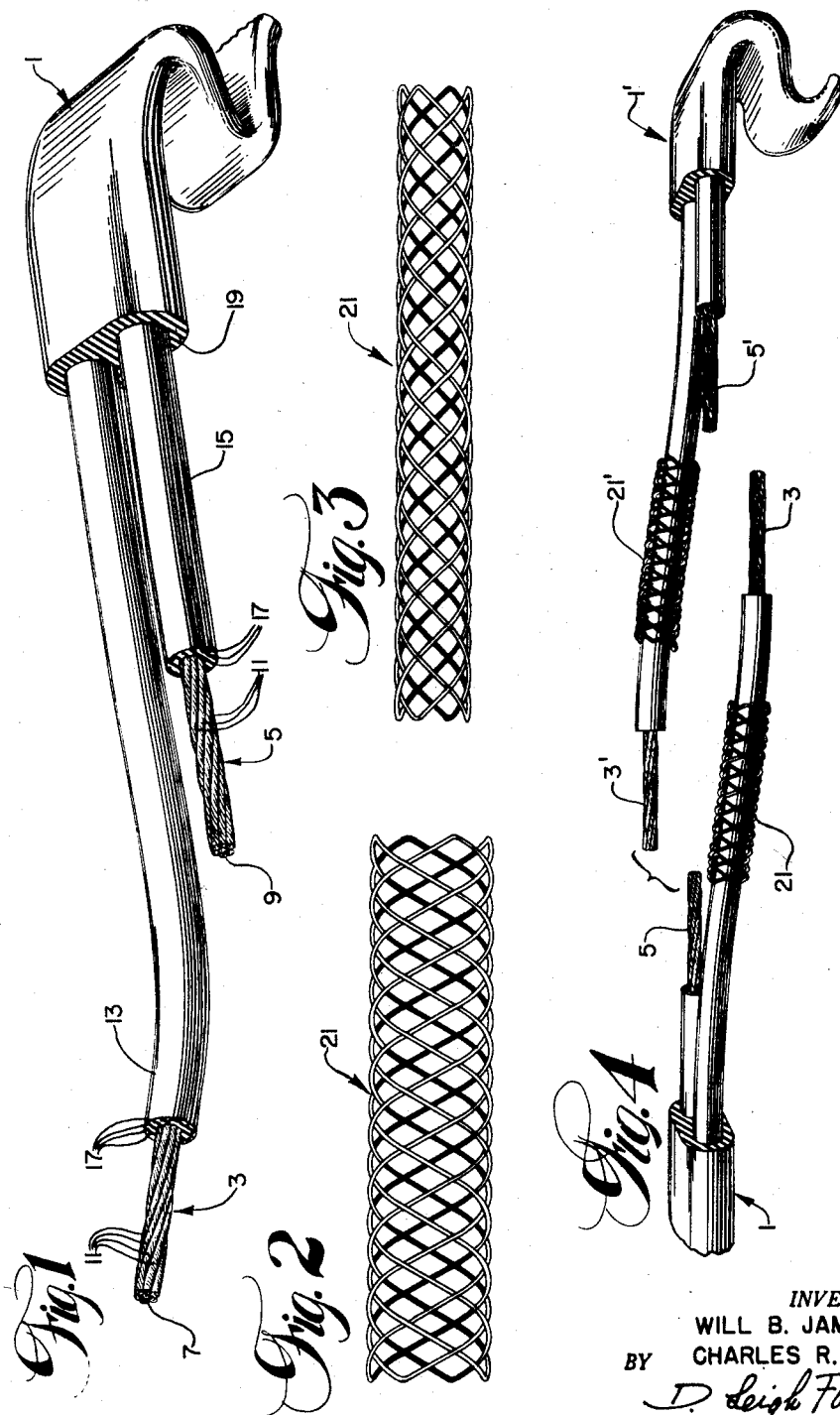
INVENTORS.
WILL B. JAMISON
BY CHARLES R. NAILLER
D. Leigh Fowler, Jr.
ATTORNEY

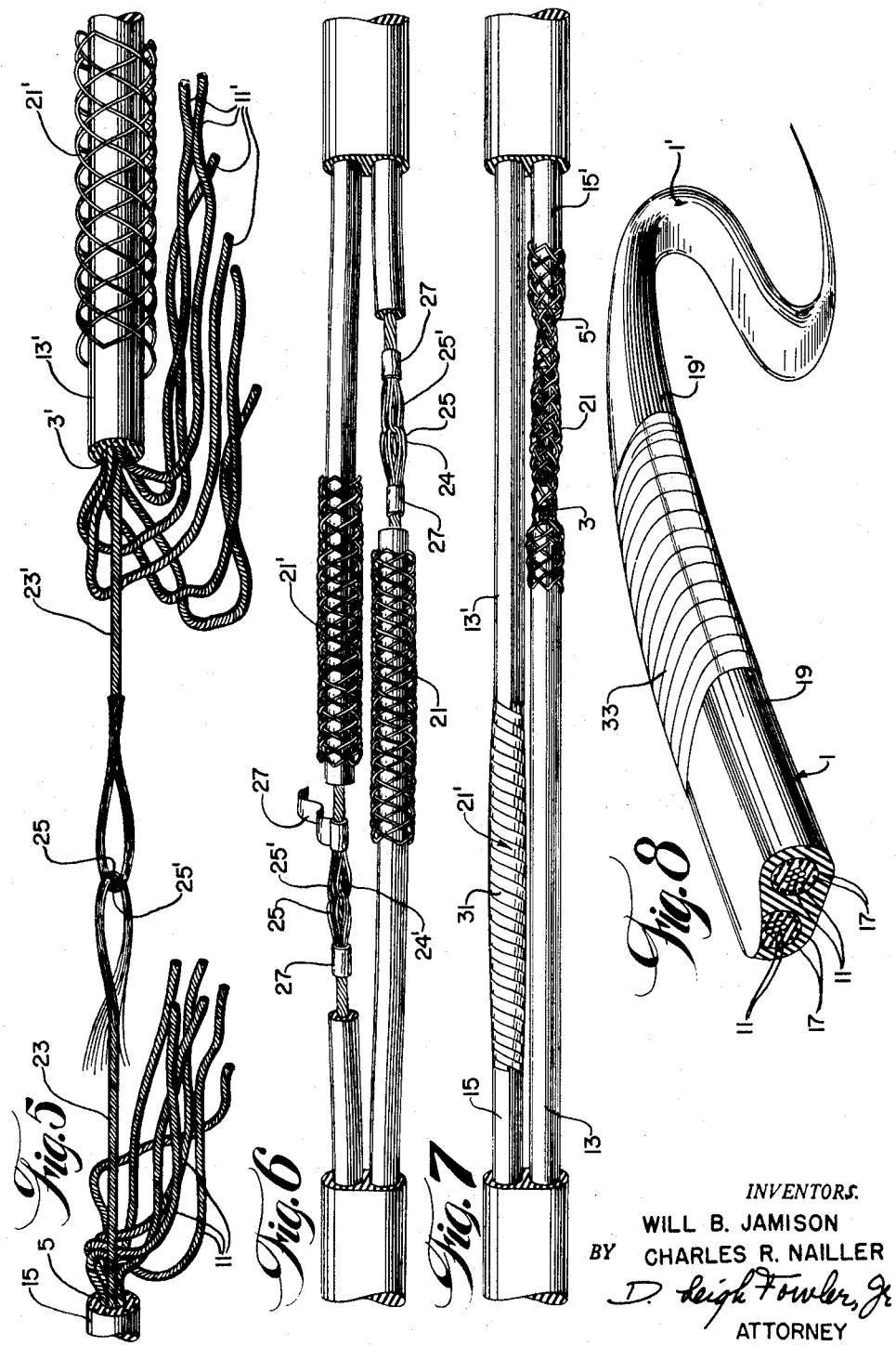

United States Patent Office 2,936,257
Patented May 10, 1960

2,936,257

METHOD AND APPARATUS FOR SPLICING ELECTRICAL MINING CABLE

Charles R. Nailler, Morgantown, W. Va., and Will B. Jamison, Greensburg, Pa., assignors to Consolidation Coal Company, Pittsburgh, Pa., a corporation of Pennsylvania Application December 4, 1956, Serial No. 626,183

5 Claims. (Cl. 154—2.22)

This invention relates to a method and apparatus for splicing electrical conductor cable, and more particularly, to a method and apparatus for splicing electrical mining trailing cable.

Electrical power is generally delivered to modern mining equipment via a trailing conductor cable. Although such a mode of power supply is especially adapted for use with mobile machinery, it has certain inherent shortcomings. The very mobility which trailing cable provides to the mining machinery quite often results in damage to the cable itself; and, as a consequence thereof, a complete work stoppage. Thus, the repair and splicing of mine cable is an integral part of present day mining operations.

The cables are often subjected to extreme abrasion as they are dragged along the mine floor and around corners in the shaft. Eventually the metallic conductor is exposed and a short circuit results or, on the other hand, the cable becomes so weakened that a complete break occurs. If the cable becomes fouled, or the operator of the machine attempts to overextend the operating distance, excessive tension will result in a break in the cable. In many instances these cables are crushed or severed when run over by heavy equipment. An immediate break may occur when the cable is damaged, or if not, further use will result in a subsequent break at the damaged point.

When a break occurs, it becomes necessary to splice the cable before mining operations can continue. The importance of restoring the machine to operation as quickly as possible is readily apparent. A splice should, therefore, be such that any miner, or other individual possessing ordinary skill with tools, can readily make it at the site of the break with tools normally found throughout a mine.

The presently available splices which can be made on the site without special tools or bulky equipment and without lengthy delay, are plagued by one or more of the following shortcomings: (1) The splice is easily pulled in two because of its low tensile strength which results in a single break being repeatedly respliced; (2) in attempting to achieve tensile strength the splice is made so bulky that it will not pass easily, if at all, through existing cable guides or small diameter rollers or sheaves and, furthermore, will not spool properly; (3) the splice is inflexible and will not pass smoothly through cable guides, rollers or sheaves, and will not spool properly; (4) inflexible sections of mining cable (e.g., a conventional splice) tend to break more readily than the flexible unspliced portions; (5) the splice does not have the length of the individual conductors balanced, which results in future failures due to the uneven tension upon the individual conductors; and (6) the individual strands of wire are damaged during the application of a conventional splicing ring or sleeve, which results in decreased electrical conductivity at the splice.

Affirmatively stated, a trailing cable splice should: (1) have a high tensile strength; (2) have an outside diameter substantially that of the unspliced cable; (3) have flexibility substantially that of the unspliced cable; (4) have balanced conductors with equal tension on each; (5) have a low electrical resistance; (6) be readily made by an individual possessing ordinary skill with tools, and (7) require no special equipment other than the tools readily at hand.

Despite the great advances made in mining equipment, there is still a need within the industry for the above-described splice. The presently available means for splicing trailing cable which satisfy requirements (6) and (7) above, as to the ease and simplicity of installation, do not meet the first five requisites dealing with the physical characteristics of the splice. Splices made according to presently available methods are generally bulky, inflexible, relatively poor electrical conductors with insufficient tensile strength.

The available splices which have the desired physical characteristics require the use of welding and vulcanizing equipment. Portable splicing units of this type have been developed, but undesirable delay occurs while such equipment is being transported from the storeroom to the location of the broken cable. The length of the shutdown is further increased by the time required to weld the conductor and to vulcanize and cure the outer covering. The method requires a substantial investment in equipment, particularly if a number of units must be kept available in the event of contemporaneous breaks at different places within the mine.

Although the present invention is particularly applicable to mining trailing cable, it may be used to splice electrical conductor cable employed for various other purposes.

It is, therefore, the principal object of this invention to provide an improved means for splicing electrical cable, and more specifically, to provide an improved means for splicing electrical mining cable.

Another object of the invention is to provide a method and apparatus for splicing electrical cable such that the finished splice will have substantially the same diameter, flexibility, electrical conductivity and tensile strength as has an equal length of unspliced cable.

A further object of the invention is to provide a method and apparatus whereby a person possessing ordinary skill with tools can, without the use of complex equipment or tools, make an improved cable splice.

Mining cables may be of single, twin, or multiple conductor construction. The general construction of each of these types of cable is essentially the same except for the variation in the number of metallic conductors which each contains.

Most metallic conductors are of a stranded rather than a solid construction. Generally a stranded metallic conductor will contain either one hundred thirty-three or two hundred fifty-nine individual strands. These strands will quite often be arranged in seven ropes of nineteen or thirty-seven strands respectively. The number and configuration of the strands may, of course, vary widely. This affects the present invention only in that a different number of wire ropes must be joined. These wire ropes are twisted together to give an overall ropelike appearance to the metallic wire conductor which they comprise.

Insulation surrounds each metallic conductor. The insulation is generally reinforced with a braid of cord or twine. Although this reinforcing braid is sometimes wound tightly around the outside of the insulation, for purposes of describing the present invention, we show the type of construction wherein the braid is embedded in the insulation. This eliminates any confusion in the figures between the reinforcing braid and the metallic "basket weave," which is employed in the present method of splicing. In twin or multiple conductor cable, the various metallic conductors are generally identified by different colored insulation.

This allows ease of matching the correct conductors when splicing. The separately insulated metallic conductors are bound together by an outer protective sheath.

The present invention comprises a means for splicing electrical conductor cable wherein an expansile and contractile braided open mesh cylinder commonly referred to as a "basket weave" is mounted so as to surround one of the metallic conductors to be joined. Then the metallic conductors which comprise one cable segment are joined to the corresponding metallic conductors of the other cable segment by the formation of interlocking U-shaped hooks. The end of each hook is taped back in abutting relation to itself so as to form a loop. Where a metallic conductor of a given cable segment is comprised of a plurality of wire ropes, the ropes are separated and each wire rope is formed into a U-shaped hook and interlocked with a corresponding wire rope of the second cable segment sought to be joined. The plurality of U-shaped hooks are then taped back collectively rather than singly. Next, the linearly compressed basket weave is slipped over the interlocked hooks and a tensile force is applied to the basket weave. This force results in a lengthwise increase in size and a radial decrease in diameter of the basket weave. As a result, the basket weave firmly engages the periphery of the elements encompassed therein. The dimensions of the basket weave may be chosen such that the element so engaged will be the exposed metallic conductors, or alternatively the exposed conductor insulations.

The basket weave is taped tightly to maintain the decreased diameter and to secure it against movement along the engaged portion of the conductor or conductor insulation as the case may be. Preferably, taping should be started midway along the basket weave and should proceed toward the ends. This helps eliminate any slack which might exist and results in a tighter grip.

After each of the one or more conductors which comprise each cable segment has been properly joined to its corresponding member, the entire splice is wrapped with some form of waterproofing and insulating material; for example, friction tape.

For a clear understanding of the present invention, its objects and advantages, reference should be had to the following detailed description and accompanying drawings in which:

Figure 1 is a perspective view of a twin conductor cable segment properly trimmed preparatory to splicing;

Figure 2 is a view of a basket weave having a radially expanded diameter due to endwise compression;

Figure 3 is a view of a basket weave having a radially diminished diameter due to endwise tension;

Figure 4 is a view of two segments of properly trimmed twin conductor cable on which basket weaves have been placed preparatory to splicing;

Figure 5 is a view of two cable conductors illustrating the method of interlocking the individual wire ropes which comprise each conductor;

Figure 6 is a view illustrating the method of taping the interlocked U-shaped hooks and the bulge that results from such interlocking.

Figure 7 is a view illustrating both the proper positioning and tightening in place of a basket weave, and the taping of a basket weave after it has been so installed; and Figure 8 is a perspective view of a completed splice.

Throughout the figures, corresponding numbers refer to corresponding parts.

For purposes of teaching the present invention, discussion has been directed to a twin conductor cable. The invention is, however, equally applicable to cables having any number of conductors as well as cables so constructed as to contain a metallic ground wire. A ground wire may be joined in the same manner as any other metallic conductor. The aforesaid will become apparent from a complete reading of the specification.

Figure 1 is a perspective view of a twin conductor cable segment 1 which has been trimmed so that there is a long metallic conductor 3 and a short metallic conductor 5 with their respective terminal points 7 and 9 staggered from about two to four inches apart and not side by side.

This lateral displacement is necessary since the problem of a bulky splice looms larger where segments of twin or multiple conductor cable are being united. Joinder of the two or more individual metallic conductors at points in side by side relation to one another would result in a splice of much larger diameter than that of the cable itself. To alleviate this problem, the individual conductors are cut off and trimmed to different lengths. The actual distance that these terminal points must be removed from one another is dependent on the length of the bulges which will result at the joinder of the metallic conductors. This lateral displacement of the points of joinder will prevent the individual metallic conductors from contacting one another in the event long usage results in disintegration or movement of the tape which individually insulates the conductors.

The optimum difference in length of the metallic conductors is that distance which will laterally displace the bulges just enough so that they do not overlap. Any additional lateral displacement results in an unnecessarily long splice, and should be avoided. The length of these bulges will vary with the number and configuration of the individual wire strands, and with the size of the cable. For the particular rope twin conductor cable herein described, a two to four inch difference in conductor length gives good results.

Both the long metallic conductor 3 and the short metallic conductor 5 are comprised of a plurality of wire ropes 11 which are twisted together to give a rope-like appearance to said metallic conductors.

Long metallic conductor 3 and short metallic conductor 5 are encased in insulation 13 and 15 respectively. Both insulation 13 and insulation 15 have reinforcing braid 17 embedded within them to provide tensile strength to the cable segment 1.

An outer protective sheath 19 encases long and short metallic conductors 3 and 5 respectively, insulation 13, insulation 15 and reinforcing braid 17.

Figure 2 shows a plurality of electrically conductive wire strands spirally interwoven about a common axis to form a braided open mesh cylinder herein referred to as a "basket weave" 21. It is well-known that the diameter of such a basket weave may be considerably altered by endwise extension and compression thereof. As depicted in this figure, the basket weave 21 has been subjected to endwise compression so as to radially increase its diameter.

As shown in Figure 3, basket weave 21 has been subjected to endwise tension to radially decrease its diameter.

The above described basket weave is especially adapted to splicing mining cable in that when placed in endwise compression (Figure 2) it may be readily placed and slidably maintained upon the insulation of the metallic conductors to be joined. When the compression force is removed and a slight endwise tensile force is applied, the basket weave will distend axially and contract radially (Figure 3) so that it will frictionally engage the periphery of the elements encompassed therein.

For purposes of illustrating the present invention a basket weave was chosen such that when linearly extended, it would securely engage the untrimmed insulation that surround each of the metallic conductors which have been interlocked. Alternatively the cable may be spliced by employing a shorter basket weave which when radially decreased in diameter will engage the exposed portion of each metallic conductor rather than the untrimmed insulation. The basket weave is further adapted to its use in the present invention in that it is constructed of a material having a high electrical conductivity, e.g., copper.

Figure 4 shows the ends of two twin conductor cable segments 1 and 1' which have been trimmed preparatory to splicing. The cable segments are trimmed such that the long and short metallic conductors 3 and 5 of cable 1 are equal to the long and short metallic conductors 3' and 5' respectively of cable segment 1'.

Since it is often important that particular conductors be joined together, it must be remembered that the long conductor 3 of cable 1 will be joined to the complementary short conductor 5' of cable 1' and that the short conductor 5 of cable 1 will be joined to the complementary long conductor 3' of cable 1'.

21 and 21' are basket weaves which have been subjected to endwise compression and installed so as to surround insulation 13 and 13' respectively.

Multiple conductor cable segments are prepared for splicing in the above-described manner with each individual conductor being cut and trimmed to a different length. The conductors of one cable segment will be complementary in length to the proper conductors of the other cable segment to be joined.

Next, the plurality of wire ropes 11 and 11' which comprise long metallic conductor 3' and short metallic conductor 5 respectively, are separated as shown in Figure 5. The individual wire ropes 23 and 23' which are made up of many strands of wire are rotated to remove their twist and thus separate the individual strands. Then the untwisted wire ropes, 23 and 23' are bent back on themselves to form U-shaped hooks 25 and 25' which are interlocked with one another (Figure 5).

After all the wire ropes 11 and 11', of long and short metallic conductors 3 and 5' respectively, as well as long and short metallic conductors 3' and 5 respectively have been similarly untwisted and interlocked, the ends of the wire ropes 11 and 11' which comprise each conductor, are cumulatively positioned in abutting relation to said conductor with resilient tape 27 (Figure 6). Taping the U-shaped hooks 25 and 25' shut in this manner protects the basket weave 21 and 21' from abrasion by the sharp wire ends, and furthermore, helps to maintain the U-shaped hooks 25 and 25' in their interlocked position.

Figure 6 further shows the slight bulges 24 and 24' which result at the joinders.

As shown in Figure 7, the basket weave 21 is longitudinally compressed and slipped over the interlocked metallic conductors 3 and 5'. An endwise tensile force is applied to the basket weave so as to decrease its diameter and cause it to firmly engage the periphery of insulation 13 and 15'. The basket weave may be so constructed that no tensile force need be applied. Upon the removal of the compressive force, the basket weave will set itself.

As shown in Figure 7, insulating tape 31 is wound firmly around the linearly extended basket weave 21' to maintain the decreased diameter and to secure the basket weave 21' against axial movement along the engaged portion of the insulation 13' and 15. Preferably taping should start midway along the basket weave and proceed toward its longitudinal extremities. This procedure eliminates any slack in the radially compressed basket weave and results in a tighter grip on the conductor insulations.

When any tension is brought to bear on the spliced cable, the basket weave will tighten its grip upon both of the insulated conductors. The tape also serves to tighten and insulate the basket weaves and prevent them from directly contacting one another.

Finally, the entire length of the splice is wound with waterproofing tape 33 as shown in Figure 8. The tape is so applied as to slightly overlap onto the outer protective sheath 19 and 19' of cables 1 and 1'. This prevents moisture from entering the splice.

The same procedure as is above set forth in reference to splicing twin conductor cable, is employed in splicing multiple conductor cable. Similarly, the ground wires found in some types of cable construction may be interlocked and firmly joined through the use of a basket weave.

The ends of the interlocked U-shaped hooks are free to slide within the loop of tape which cumulatively binds them in abutting relation to the conductor which they comprise. Although the interlocked U-shaped hooks are substantially of equal length, any minor discrepancy may be corrected by such sliding action. The amount of movement will, of course, be limited by the maximum linear extensibility of the basket weave, and by the binding effect of the radially diminished basket weave as the linear extensible limit is approached. Within these limits, however, the conductors are self-adjusting such that they each bear substantially the same share of any tensile force applied.

Some of the tensile force applied to a cable spliced according to the present invention will be borne by the basket weave itself. The remainder will be borne by the interlocked metallic conductors. When tension is applied to the cable and consequently to the basket weave, the basket weave compresses and causes the interlocked hooks to pinch tightly together, thus gripping one another.

The basket weave serves another useful purpose in that it acts as an electrical conductor. The natural tendency of a basket weave to pinch-in at its mid-point when subjected to a tensile force and the fact that this pinching effect occurs precisely at the point where the various wire ropes are interlocked to form a slight bulge, results in an excellent electrical contact. Furthermore, the pinching effect tends to compress the bulging U-shaped hooks and maintain a small diameter. The present invention thus provides a splice of low electrical resistance since the current can pass not only through the interlocked strands of the original conductor, but also through the electrically conductive basket weave.

Although a splice made according to the present invention has great strength and durability, its diameter is essentially that of the unspliced cable. This absence of bulk combined with the flexibility of such a splice allows the spliced cable to pass freely through existing cable guides and sheaves. Furthermore, the spliced cable will spool as readily as an unspliced cable.

To splice a mining cable according to the present invention, a man possessing a normal skill with tools needs have available only a conductive basket weave specifically adapted for use with mining cable, and the conventional hand tools available in a mine.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. The method of splicing electrical conductor cable segments which comprises surrounding the exposed insulation of one of the pair of metallic conductors to be joined with a linearly compressed basket weave of electrically conducting material, interlocking the ends of said metallic conductors in electrically conductive relationship, sliding said linearly compressed basket weave over said interlocked metallic conductors, linearly extending and radially decreasing the diameter of said basket weave to bring at least a portion of said basket weave into abutting relation with said interlocked conductors to thereby provide an electrically conductive relationship between said interlocked conductors and said basket weave and to peripherally engage the ends of said basket weave around the encompassed elements, further securing the linearly extended basket weave against axial movement along the engaged elements by maintaining the decreased diameter and surrounding the joinder of said cable segments with an electrical insulating material.

2. The method of splicing electrical conductor cable segments which comprises surrounding the exposed insulation of one of the pair of metallic conductors to be joined in a linearly compressed basket weave of electrically conducting material, interlocking the ends of said metallic conductors in electrically conductive relationship, sliding said linearly compressed basket weave over said interlocked metallic conductors, linearly extending and radially decreasing the diameter of said basket weave to bring at least a portion of said basket weave into abutting relation with said interlocked conductors to thereby provide an electrically conductive relationship between said interlocked conductors and said basket weave and to peripherally engage the ends of said basket weave against the insulation of both metallic conductors so joined, further securing the linearly extended basket weave against axial movement along both engaged portions of said insulation by maintaining the decreased diameter and surrounding the joinder of said cable segments with an electrical insulating material.

3. The method of splicing electrical conductor cable segments which comprises surrounding the exposed insulation of one of the pair of metallic conductors to be joined with a linearly compressed basket weave of electrically conducting material, interlocking the ends of said metallic conductors in electrically conductive relationship, sliding said linearly compressed basket weave over said interlocked metallic conductors, linearly extending and radially decreasing the diameter of said basket weave to bring at least a portion of said basket weave into abutting relation with said interlocked conductors to thereby provide an electrically conductive relationship between said interlocked conductors and said basket weave and to peripherally engage the ends of said basket weave against both metallic conductors so joined, further securing the linearly extended basket weave against axial movement along both engaged portions of said metallic conductors by maintaining the decreased diameter and surrounding the joinder of said cable segments with an electrical insulating material.

4. The method of splicing electrical conductor cable segments comprised of a plurality of insulated metallic conductors which comprises surrounding the exposed insulation of one of each of the pairs of metallic conductors to be joined with a linearly compressed basket weave of electrically conducting material, interlocking the ends of each pair of metallic conductors to be joined in electrically conductive relationship, sliding each of said linearly compressed basket weaves over each of said interlocked pair of metallic conductors, linearly extending and radially decreasing the diameter of each of said basket weaves to bring at least a portion of said basket weaves into abutting relation with said respective interlocked conductors to thereby provide an electrically conductive relationship between said interlocked conductors and said basket weave and to peripherally engage the ends of each of said basket weaves around both of the metallic conductors of each pair so joined, further securing each linearly extended basket weave against axial movement along the engaged portions of each pair of metallic conductors so joined, by maintaining the radially decreased diameter and surrounding the joinder of said cable segments with an electrical insulating material.

5. The method of splicing multiple conductor electrical cable which comprises trimming the plurality of metallic conductors which comprise one of the cable segments to be joined to varying lengths, trimming the plurality of metallic conductors which comprise the other cable segment to be joined to corresponding varying lengths, surrounding the exposed insulation of one metallic conductor of each pair to be joined with a linearly compressed basket weave of electrically conducting material, interlocking the ends of each pair of said metallic conductors in an electrically conductive relationship, sliding each linearly compressed basket weave over each pair of interlocked metallic conductors, linearly extending and radially decreasing the diameter of each of said basket weaves to bring at least a portion of said basket weaves into abutting relation with said respective interlocked conductors to thereby provide an electrically conductive relationship between said interlocked conductors and said basket weave and to engage the ends of each of said basket weaves against the periphery of the insulation of both metallic conductors of each pair to be joined and the middle of each of said basket weaves against the periphery of said interlocked metallic conductors, further securing each of said linearly extended basket weaves against axial movement along the engaged portion of each of said conductor segments by maintaining the radially decreased diameter and surrounding the joinder of said cable segments with an electrical insulating material.

References Cited in the file of this patent

UNITED STATES PATENTS

| | | |
|---|---|---|
| 1,737,650 | Emanueli | Dec. 3, 1929 |
| 2,093,838 | Kellems | Sept. 21, 1937 |
| 2,112,281 | Ferris | Mar. 29, 1938 |
| 2,164,278 | Kellems | June 27, 1939 |
| 2,435,284 | Lodge | Feb. 3, 1948 |
| 2,536,173 | Hamilton | Jan. 2, 1951 |